United States Patent
Cuny et al.

(10) Patent No.: US 9,302,556 B2
(45) Date of Patent: Apr. 5, 2016

(54) VALVE ASSEMBLY FOR AIR MAINTENANCE TIRE

(71) Applicant: The Goodyear Tire & Rubber Company, Akron, OH (US)

(72) Inventors: Andre Cuny, Habay-la-Neuve (BE); Gauthier Piret, Ster-Francorchamps (BE); Massimo Di Giacomo Russo, Kehlen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 402 days.

(21) Appl. No.: 13/960,849

(22) Filed: Aug. 7, 2013

(65) Prior Publication Data
US 2015/0041035 A1    Feb. 12, 2015

(51) Int. Cl.
*B60C 23/12*    (2006.01)
(52) U.S. Cl.
CPC ......... *B60C 23/12* (2013.01); *Y10T 152/10495* (2015.01)
(58) Field of Classification Search
CPC ........ B60C 23/00; B60C 23/10; B60C 23/12; B60C 23/0496; B60S 5/04; F16K 15/185; F16K 15/20; F16K 15/202; F16K 17/00
USPC .......... 152/419, 423–426; 137/223, 225–226, 137/230
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 3,304,981 A | 2/1967 | Sheppard | |
| 3,833,041 A | 9/1974 | Glad et al. | |
| 3,867,973 A | 2/1975 | Cozzolino et al. | |
| 3,994,312 A * | 11/1976 | Tanner | B60C 23/0496 137/226 |
| 4,151,863 A * | 5/1979 | Stevens | B60C 23/0496 137/230 |
| 4,660,590 A * | 4/1987 | Sanchez | B60C 23/0496 137/226 |
| 4,681,148 A * | 7/1987 | Decker, Jr. | B60C 23/0496 137/230 |
| 4,922,984 A | 5/1990 | Dosjoub et al. | |
| 5,052,456 A | 10/1991 | Dosjoub | |
| 5,067,449 A * | 11/1991 | Bonde | F01M 13/00 123/41.86 |

(Continued)

FOREIGN PATENT DOCUMENTS

DE    3433318 A1    3/1986
EP    2433822 A1    3/2012

(Continued)

OTHER PUBLICATIONS

European Search Report, dated Dec. 4, 2014, 2 pages.

*Primary Examiner* — Jason Bellinger
(74) *Attorney, Agent, or Firm* — Robert N. Lipcsik

(57) ABSTRACT

An air maintenance tire and air pump assembly includes a sidewall and a tire cavity for maintaining pressure; an elongate tubular air passageway enclosed within a flexing region of the sidewall, air passageway, the air passageway operably closing segment by segment in reaction to induced forces from the tire flexing region as the flexing region of the tire wall rotates adjacent a rolling tire footprint, the elongate air passageway having at least one check valve device seated within the axial air passageway; and a relief valve assembly comprising a chamber body, a valve, a piston, and a silicone ring, the valve having a valve body and a valve head, the valve head, deforming to release over-pressurized air from the tire cavity to atmosphere.

15 Claims, 18 Drawing Sheets

(56) References Cited

U.S. PATENT DOCUMENTS

| | | | |
|---|---|---|---|
| 5,507,318 A * | 4/1996 | Israelson | F04B 53/1065 |
| | | | 137/854 |
| 5,762,103 A * | 6/1998 | Gregoire | F16K 15/142 |
| | | | 137/512.15 |
| 5,988,245 A | 11/1999 | Rosenberg | |
| 7,117,731 B2 | 10/2006 | Hrabal | |
| 7,225,845 B2 | 6/2007 | Ellmann | |
| 8,042,586 B2 | 10/2011 | Losey et al. | |
| 8,113,254 B2 | 2/2012 | Benedict | |
| 8,356,620 B2 * | 1/2013 | Colussi | F16K 11/105 |
| | | | 137/225 |
| 8,960,249 B2 * | 2/2015 | Lin | B60C 23/12 |
| | | | 152/419 |
| 2008/0087590 A1 * | 4/2008 | Jergens | B01D 27/103 |
| | | | 210/130 |
| 2009/0294006 A1 | 12/2009 | Hrabal | |
| 2011/0272073 A1 | 11/2011 | Losey | |
| 2014/0110029 A1 * | 4/2014 | Benedict | B60C 23/12 |
| | | | 152/429 |

FOREIGN PATENT DOCUMENTS

| | | |
|---|---|---|
| EP | 2468540 A1 | 6/2012 |
| RU | 2106978 C1 | 3/1998 |
| WO | 03049958 A1 | 6/2003 |
| WO | 2005012009 A1 | 2/2005 |
| WO | 2007134556 A1 | 11/2007 |
| WO | 2010008338 A1 | 1/2010 |

* cited by examiner

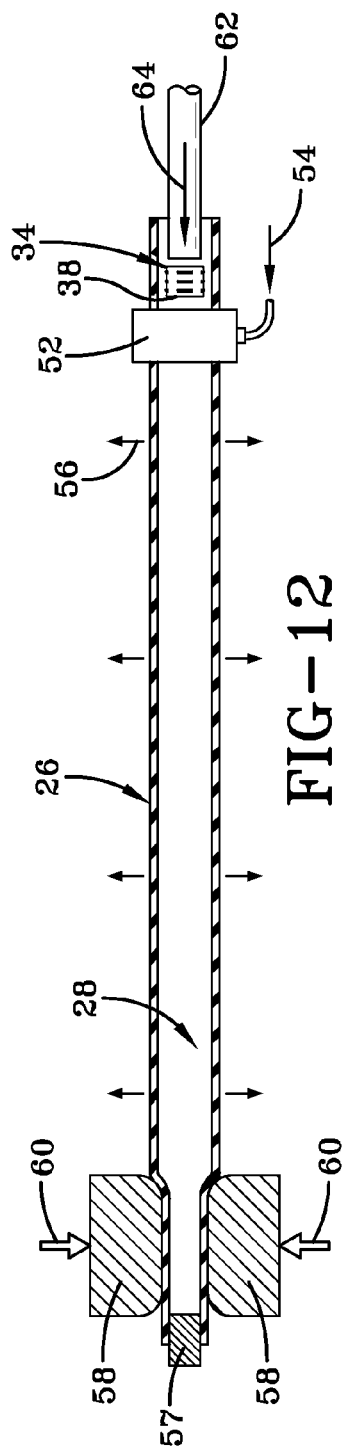
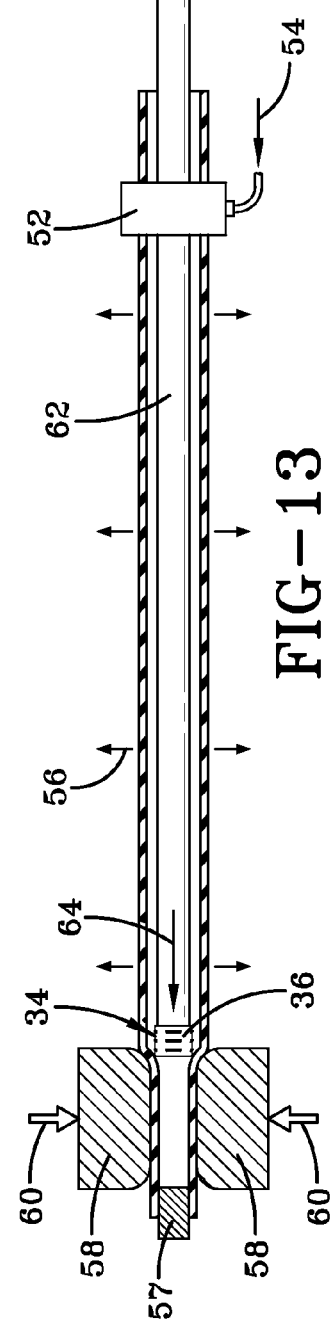
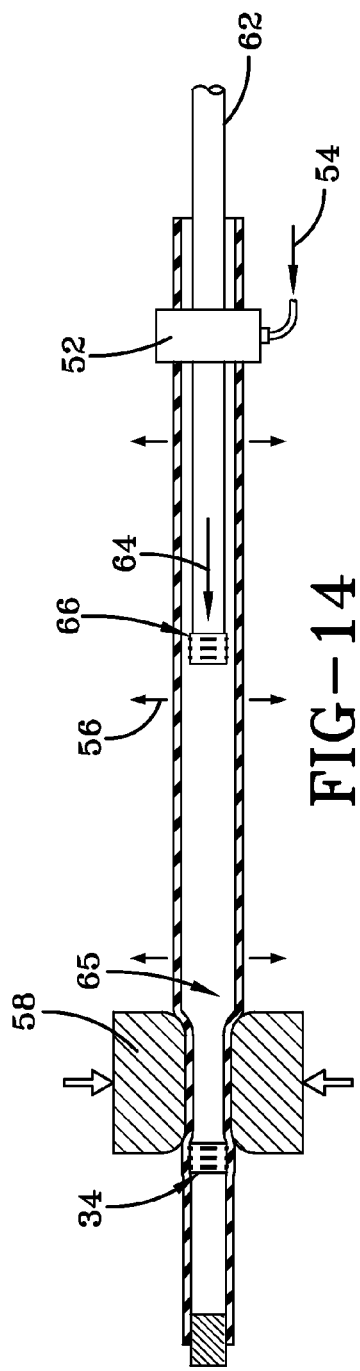

– 1 –

VALVE ASSEMBLY FOR AIR MAINTENANCE TIRE

FIELD OF THE INVENTION

The present invention relates generally to air maintenance systems for a pneumatic tire and, more specifically, to such systems that affix an air pump apparatus to a pneumatic tire which maintains air pressure within the pneumatic tire as the tire rotates under load.

BACKGROUND OF THE INVENTION

Normal air diffusion reduces tire pressure over time. The natural state of pneumatic tires is under inflated. Accordingly, drivers must repeatedly act to maintain tire pressures or they will see reduced fuel economy, tire life, and/or reduced vehicle braking and handling performance. Tire pressure monitoring systems have been proposed to warn drivers when tire pressure is significantly low. Such systems, however, remain dependant upon the driver taking remedial action when warned to re-inflate a pneumatic tire to the recommended pressure. It is a desirable, therefore, to incorporate a self-inflating feature within a pneumatic tire that will self-inflate the tire in order to compensate for any reduction in tire pressure over time without the need for driver intervention.

SUMMARY OF THE PRESENT INVENTION

An air maintenance tire and air pump assembly in accordance with the present invention includes a tire having a tread region and first and second sidewalls extending from the tread region and a tire cavity for maintaining pressure; an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway operably closing segment by segment in reaction to induced forces from the tire flexing region as the flexing region of the tire wall rotates adjacent a rolling tire footprint, the elongate air passageway having at least one check valve device seated within the axial air passageway; and a relief valve assembly comprising a chamber body, a valve, a piston, and a silicone ring, the valve having a valve body and a valve head, the valve head, deforming to release over-pressurized air from the tire cavity to atmosphere.

According to another aspect of the assembly, the valve head is encased by an elastic material and closes an orifice of the chamber body thereby allowing air escape to atmosphere.

According to still another aspect of the assembly, the piston is movable for extension through the chamber body from an internal cavity of the valve body to an internal cavity of the chamber body.

According to yet another aspect of the assembly, a gasket seals an interface between the piston and the sleeve.

According to still another aspect of the assembly, the valve body is tubular with the sleeve being partially radially inserted into the valve body.

According to yet another aspect of the assembly, the sleeve includes a radial bore defining an air way extending between an internal cavity of the chamber body and an internal cavity of the valve body.

According to still another aspect of the assembly, the sleeve and the piston partially define a valve internal cavity.

According to yet another aspect of the assembly, the silicone ring is fitted to an end of the piston.

According to still another aspect of the assembly, the piston and the silicone ring are entirely within an internal cavity of the valve body and, simultaneously, flow through a radial bore within the sleeve is unobstructed.

According to yet another aspect of the assembly, pressure within the chamber body and the valve body are equalized by radial clearance between the sleeve and the piston.

According to still another aspect of the assembly, the piston and silicone ring are entirely within the sleeve and air through a radial bore of the sleeve is obstructed.

According to yet another aspect of the assembly, pressure within the chamber body and the valve body are independent and separate.

According to still another aspect of the assembly, axial movement of the piston and the silicone ring into the sleeve causes a pressure decrease in the valve body such that a release vent of the tire cavity to the chamber body is no longer completely blocked by the valve head.

According to yet another aspect of the assembly, the valve head is maintained in a deformed condition.

According to still another aspect of the assembly, the chamber body includes radial outlets to atmosphere.

According to yet another aspect of the assembly, a supplemental spacer axially adjacent to the sleeve mitigate twisting during assembly.

A second air maintenance tire and air pump assembly, for use with the present invention, includes a tire; an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway operably closing segment by segment in reaction to induced forces from the tire flexing region as the flexing region of the tire wall rotates opposite to a rolling tire footprint. Multiple spaced apart check valve devices are seated within and along the axial air passageway, dividing the air passageway into multiple passageway segments. Each check valve device has an external dimension and configuration operable to substantially occupy the air passageway. A valve gate, such as a membrane, allows pressurized air to directionally pass through the check valve device from an upstream passageway segment to a downstream passageway segment. The valve gate in a closed position prohibits air from passing in an opposite direction through the check valve body from the downstream passageway segment to the upstream passageway segment.

In another aspect of the second assembly, the air passageway may alternatively be configured as an integrally formed passageway within the tire sidewall or as an axial passage provided by a flexible air tube that is assembled to the tire in a post-cure procedure.

In still another aspect of the second assembly, each check valve device is configured as a tubular body closely received within the air passageway, the tubular body having outwardly projecting retention barb(s) for securing the tubular body at a preferred location within the air passageway. The tubular body houses a flexible membrane member which serves as the valve gate. The membrane opens along a slit to admit pressurized air from one side of the check valve device to an opposite side.

In yet another aspect of the second assembly, the check valve devices may be positioned and spaced along a continuous air passageway extending between the inlet and outlet portals, or, alternatively, serve to connect air tube segments together in a splicing check valve configuration.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 12 is a partial section view showing a check valve being introduced into an inflated tube by a rod.

FIG. 13 is a partial section view showing the check valve being seated in place in an inflated tube by the rod.

FIG. 14 is a partial section view showing a second check valve being introduced into the inflated tube by a rod.

DETAILED DESCRIPTION OF EXAMPLES OF THE PRESENT INVENTION

Figure 1:
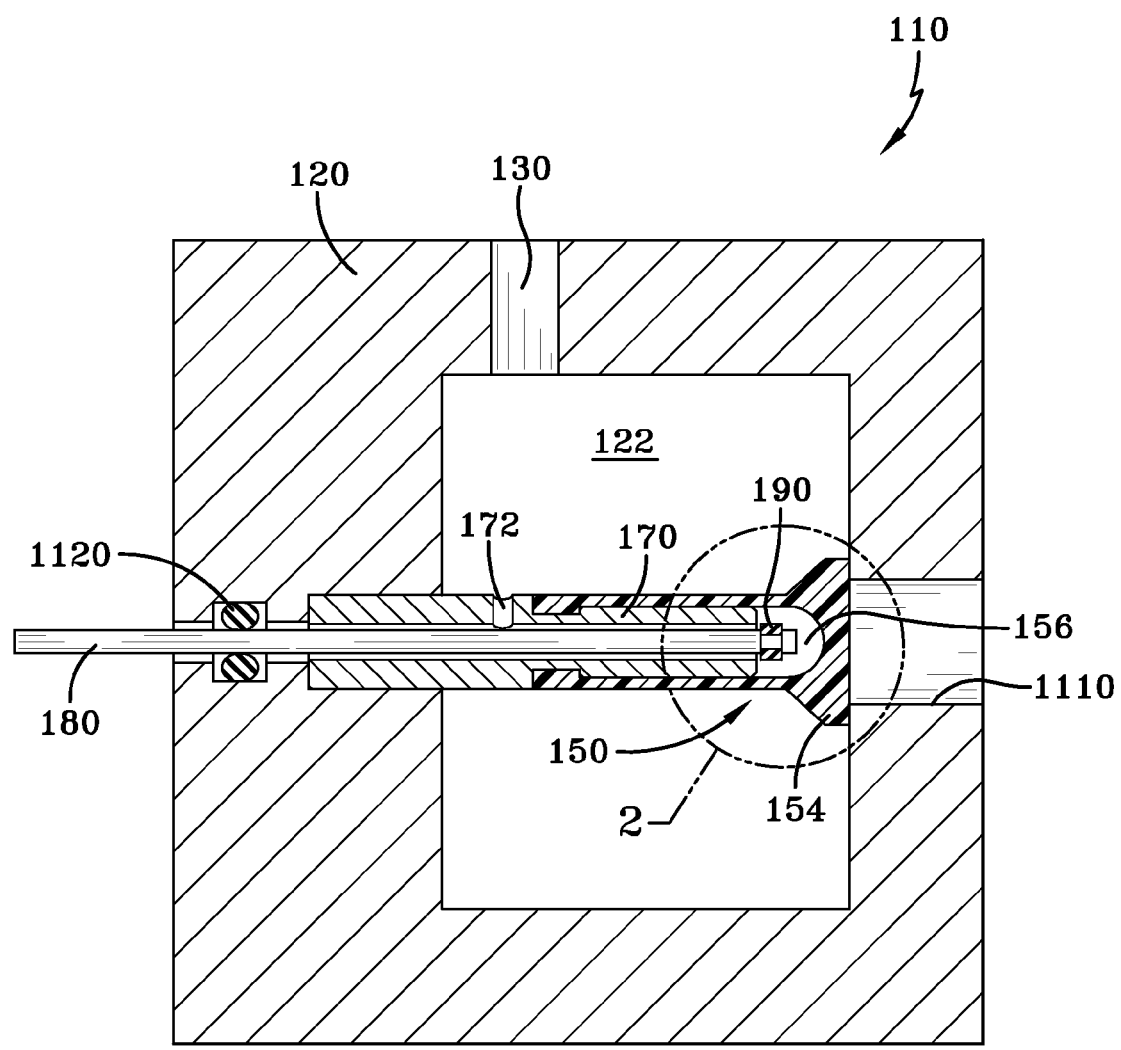
FIG. 1 is a schematic sectional view of a valve in accordance with the present invention.

A pneumatic tire and air maintenance pump assembly (forming an "air maintenance tire" or "AMT") in accordance with the present invention may include an example pneumatic tire and an example vein pump assembly as set forth in US Publication No. 2014/0110029 A1 and owned by The Goodyear Tire & Rubber Company, incorporated herein in its entirety by reference. The general operation of one example peristaltic pump for use in an example pneumatic tire is described in U.S. Pat. Nos. 8,113,254 and 8,042,586, both filed on Dec. 12, 2009, and issued on Feb. 14, 2012 and Oct. 25, 2011, respectively, and owned by The Goodyear Tire & Rubber Company, both also incorporated herein in their entirety by reference.

The AMT tire 10, 12 may have a tread region 14 and a pair of sidewalls 16, 18 extending from opposite bead areas 22, 24 to the read region. The AMT tire 10, 12 may enclose a tire cavity 20. The air maintenance assembly 10 may include an elongate air tube 26 that encloses an annular passageway 28. The tube 26 may be formed of a resilient, elastomeric flexible material, such as plastic or rubber compounds and composites that are capable of withstanding repeated deformation cycles wherein the tube is deformed into a flattened condition subject to external force and, upon removal of such force, returns to an original condition generally circular in cross-section. The tube 26 may have a diameter sufficient to operatively pass a volume of air for the purpose of maintaining air pressure within the cavity 20. The tube 26 may follow a 180 degree semi-circular path, as in the configuration of FIG. 9. However, other configurations may be employed without departing from the present invention.

The air maintenance vein pump assembly 10 may further include an inlet device 30 and an outlet device 32 spaced apart approximately 180 degrees at diametrically opposite end locations of the air tube 26. The outlet device 32 may have a T-shaped configuration in which T-forming sleeves connect to an end of the tube 26 and an outlet conduit conducts air from the tube to the tire cavity 20. The inlet device 30 likewise may have a T-shaped configuration connecting to an opposite end of the tube 26 and an inlet conduit which intakes outside air into the tube 26. Situated within the inlet and outlet devices 30, 32 may be appropriate commercially available valve mechanisms for controlling air intake into the tube 26 and outlet from the tube into the tire cavity 20.

Figure 6:
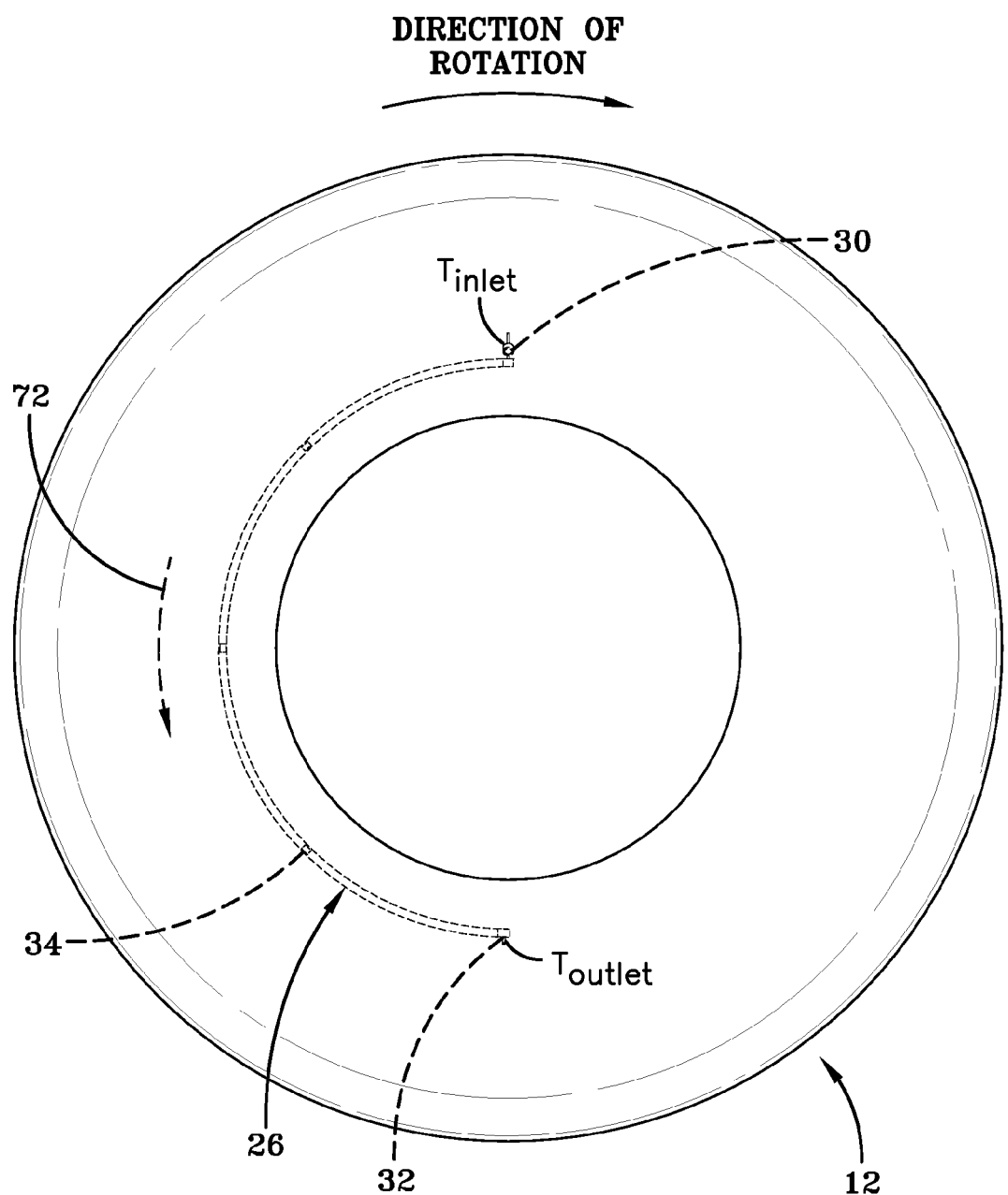
FIG. 6 is a side view of the tire with a 180 degree peristaltic tube and multiple check valves in place.

As will be appreciated from FIG. 6, the air tube 26, inlet device 30, and outlet device 32 may be positioned within an appropriate complementarily configured channel within one of the tire sidewalls 16 and/or 18. As the AMT tire 10, 12 rotates in the direction of rotation indicated, a footprint may be formed against a ground surface (not shown). A compressive force may thus be directed into the tire 12 from the footprint and may act to flatten a segment of the tube 26 and passageway 28. As the tire 12 rotates further, the tube 26 and passageway 28 may be sequentially flattened and may pump air in the direction 72 shown in FIG. 6. Flattening of the tube 26, segment by segment, thereby may force air from the inlet along the tube passageway 28, until the pressurized air is directed from the outlet and into the tire cavity 20. An appropriate valve mechanism at the outlet may vent air in the event that the tire cavity pressure is at or above the recommended tire pressure. Pumping of air occurs for one-half of the revolution of the tire 12 with the 180 degree air tube configuration shown.

Figure 7:
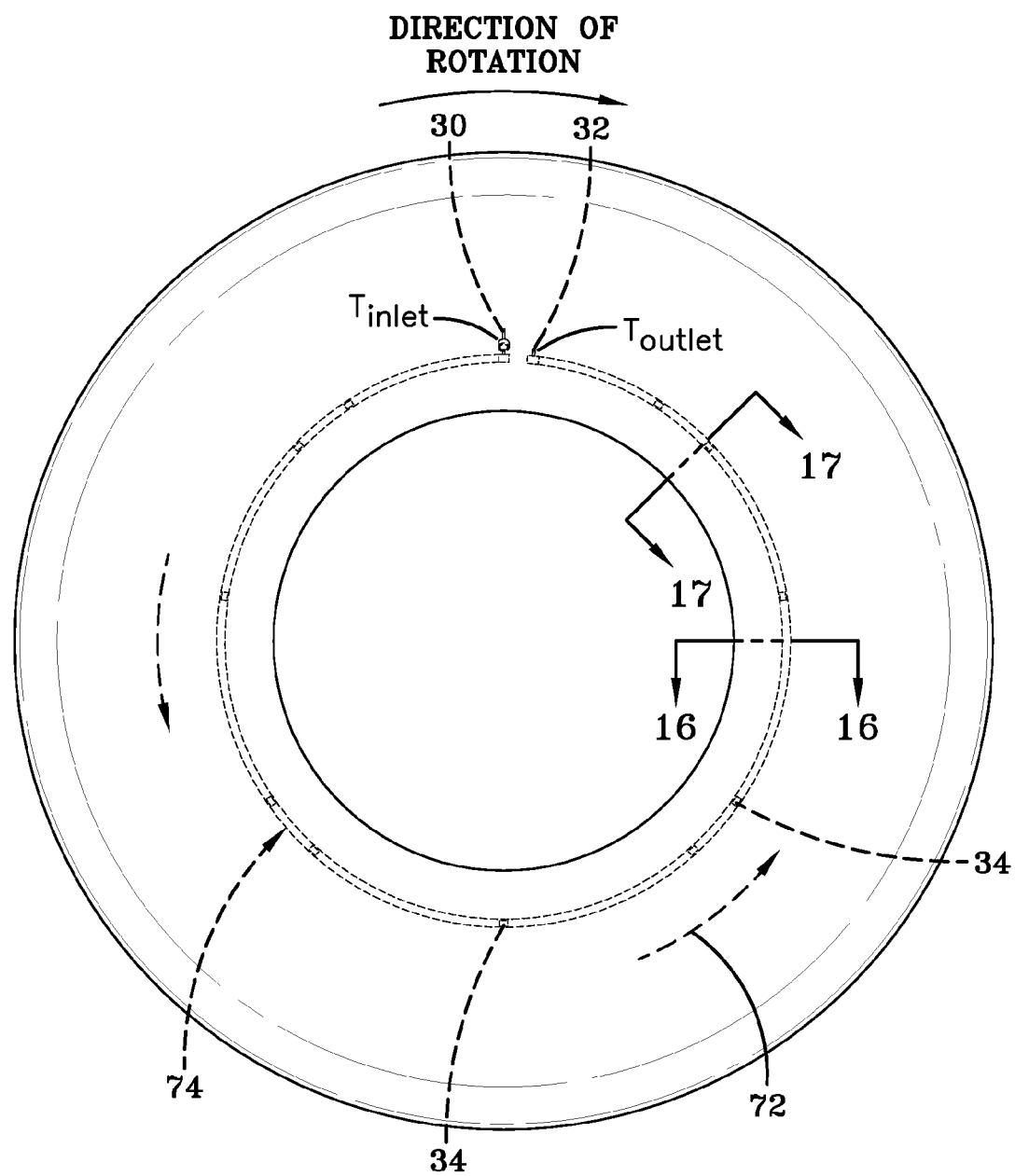
FIG. 7 is a side view of the tire with a 360 degree peristaltic tube alternative embodiment.
Figure 8:
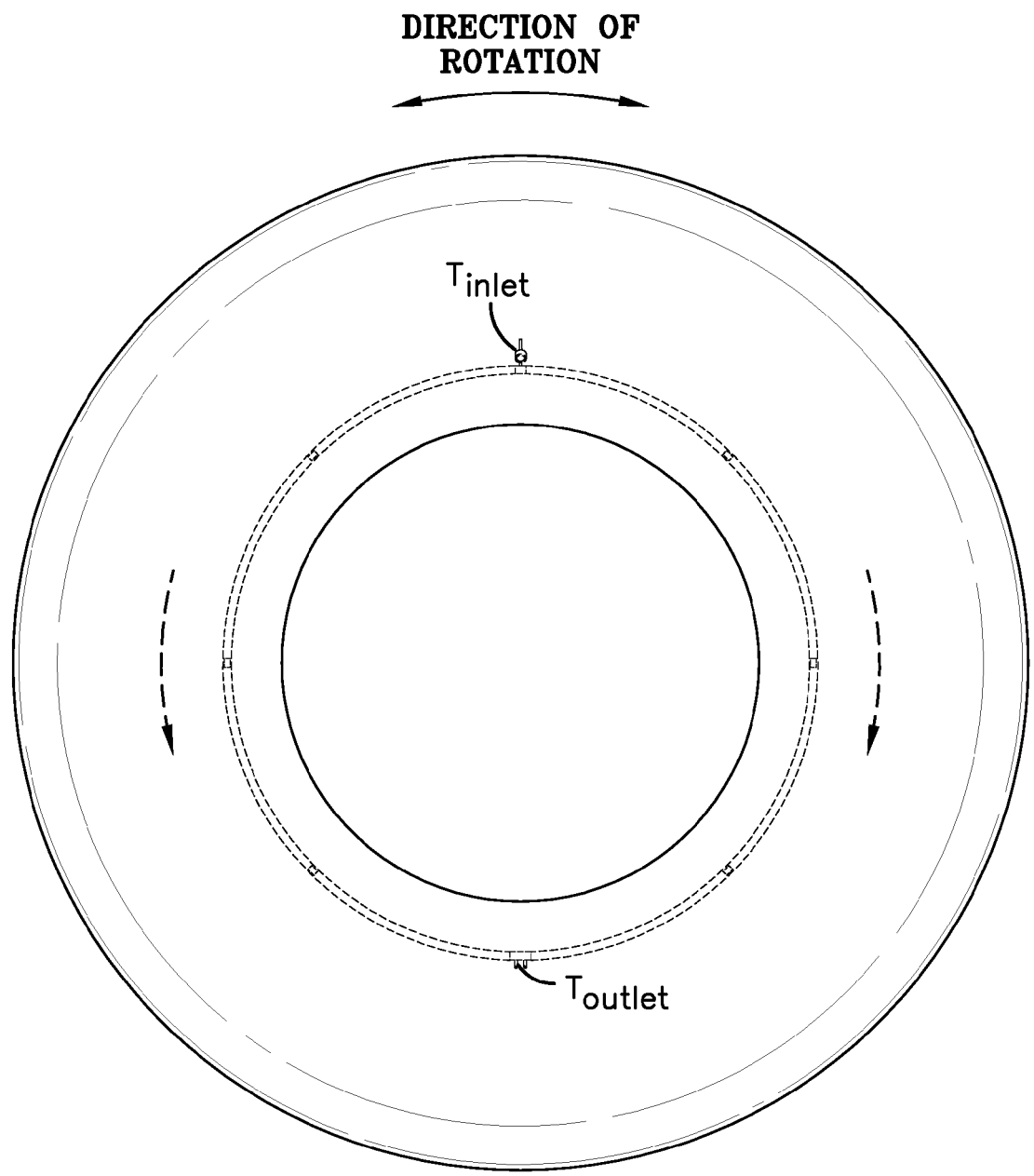
FIG. 8 is a side view of the tire with two 180 degree peristaltic tubes in an alternative embodiment.

FIG. 7 shows an alternative 360 degree air tube which functions as described above, with the exception that air is pumped along the air tube 26 in direction 72 for the entire 360 degree revolution of the tire. FIG. 8 shows a tire with two 180 degree peristaltic tubes 26 as an alternative embodiment. In the FIG. 8, the pump may function in either direction of tire rotation shown by the directional arrows. The two air tubes 26 may each operate in a respective direction of rotation to pump air into the tire cavity 20.

Figure 9:
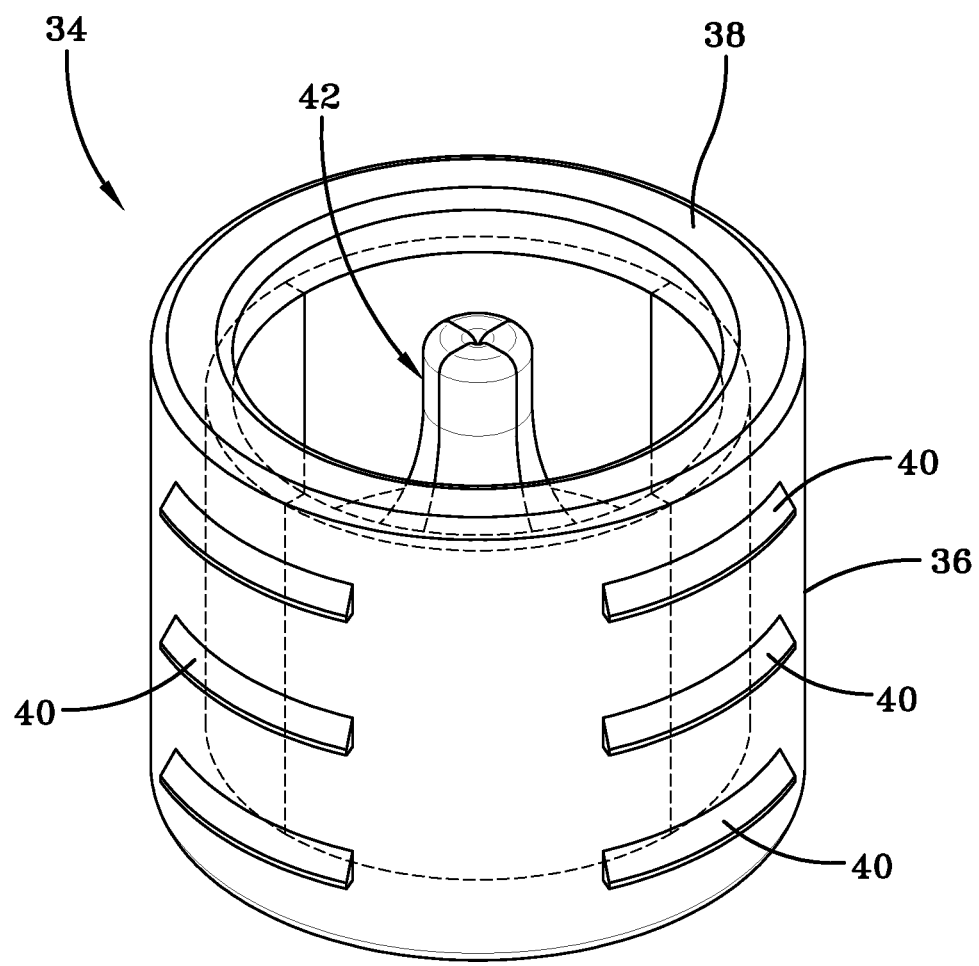
FIG. 9 is a perspective view of an example check valve prior to insertion into a peristaltic tube.
Figure 10:
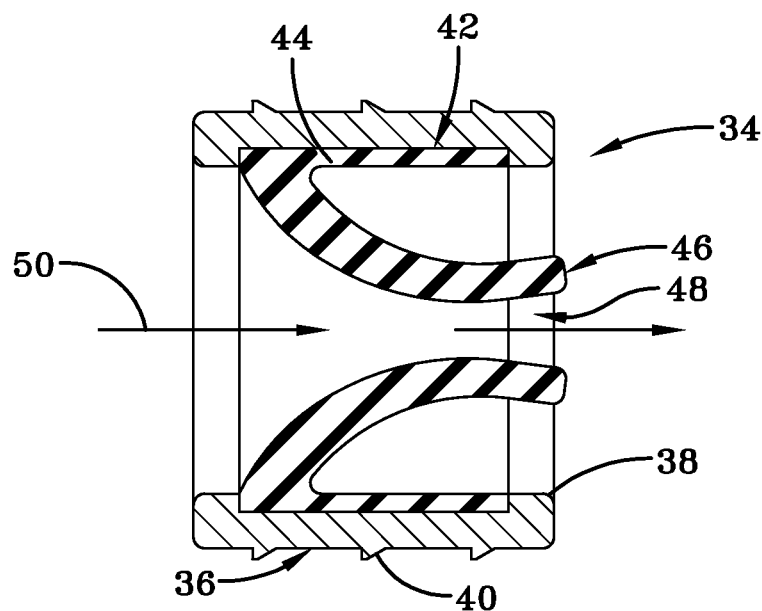
FIG. 10 is a section view of the check valve of FIG. 9 in the "open" flow position.
Figure 11:
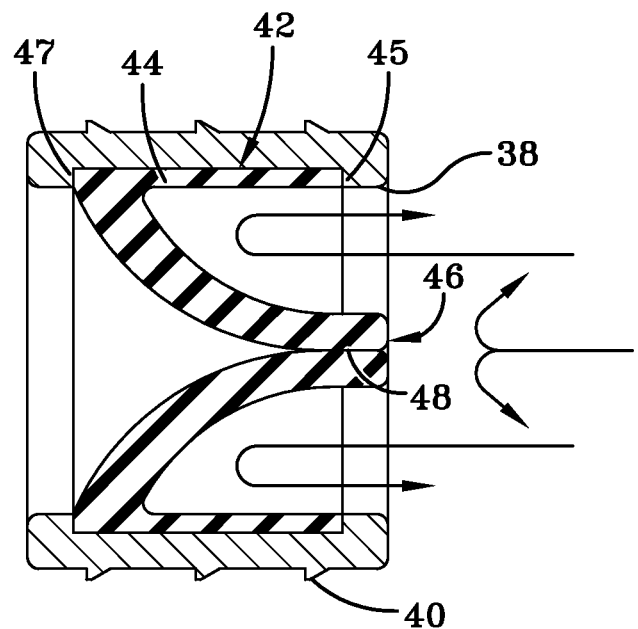
FIG. 11 is a section view of the check valve of FIG. 9 in the "closed" flow position.

With reference to FIGS. 9, 10, and 11, a plurality of check valves 34 may be positioned in the passageway 28 of the tube 26. The check valves 34 may include a cylindrical valve body 36, composed of any suitable rigid or semi-rigid material. The body 36 may have a rounded forward end rim 38. An array of outwardly directed retention ribs or flanges 40 may be spaced apart along the surface of the valve body 36, each retention flange 40 angling to the rear of the valve body. A flexible membrane member 42 of suitable elastomeric composition may be positioned in a central throughpassage of the valve body 36. The membrane member 42 may include a cylindrical membrane body captured within the valve body 36 by in-turned end flanges 45, 47 of the valve body 36. The membrane insert 42 may further include a central projecting nose 46 having a slit 48 therethrough. The nose 46 may form a gate through which pressurized air may flow in a forward direction 50 (FIG. 10), but which prevents a back flow of air through the check valve 34 in a rearward direction (FIG. 11).

FIGS. 12, 13, & 14 show an assembly sequence whereby multiple check valves 34 may be inserted into the axial passageway 28 of the elastomeric flexible tube 26. The multiple check valves 34 may occupy spaced apart respective locations within the tube 26 in an orientation which facilitates a flow of pressurized air in a forward direction from the inlet device 30 to the outlet device 32, but which prevents a back flow of pressurized air in the reverse direction. As seen in FIG. 12, a pressurized air source 52 may inject pressurized air 54 into the tube passageway 28 whereby radially expanding the tube 26 in the direction 56 so that the passageway 28 assumes a temporary, oversized diameter. A stopper 57 may be inserted into a forward end of the tube 26 to prevent the flow 54 from escaping.

At a location within the passageway 28 that a check valve 34 is located, a clamping collar 58 may be affixed over the tube 26 and may exert a radial force 60 on the tube 26 thereby preventing the tube from expanding at that location. Thereafter, a check valve 34 may be inserted into an open end of the tube 26 with the membrane gate 46 opening toward the outlet end of the tube. A rod 62 may push the check valve 34 through the expanded tube 26 until the check valve reaches an intended location within passageway 28, as shown in FIG. 13.

Figure 17:
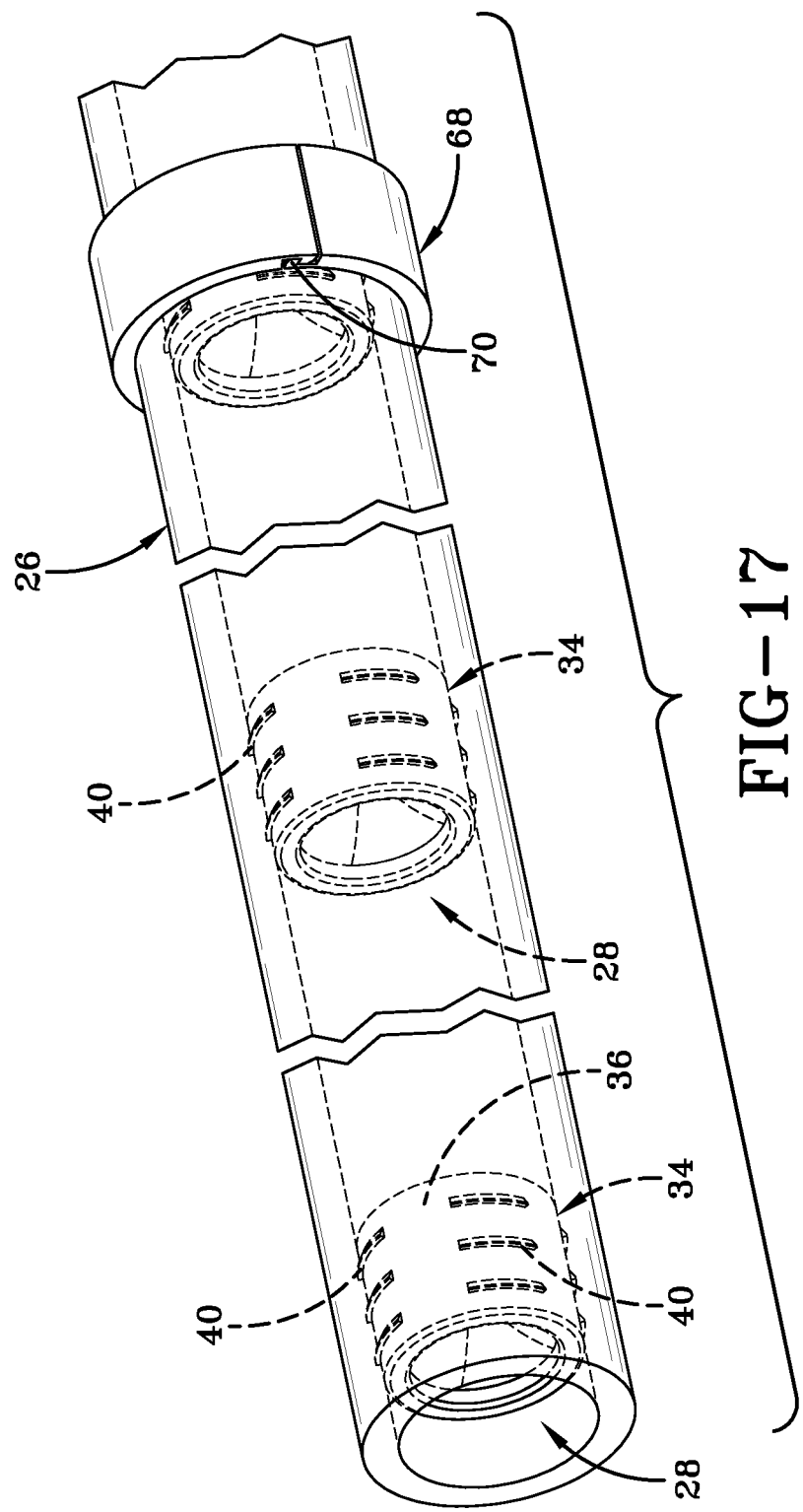
FIG. 17 is a perspective view of a tube with 3 valves in place, the right valve retained in its intended location by a clamp.

The clamping collar 58 may then be removed and relocated down the axial length of the tube 26 to a location where a second check valve 66 is located. The second check valve 66 may be positioned at the open end of the tube 26 and pushed by the rod 62 through the diametrically expanded tube into the intended second check valve location 65 within the passageway 28. FIG. 14 illustrates insertion of the second check valve 66 by the rod 62. The above procedure is repeated until all of the check valves 34 are in place within the tube 26. Once the pressurized air flow 54 is withdrawn from the passageway 28, the tube 26 elastically contracts radially into its original unexpanded condition. The tube 26 may thus capture each placed check valve 34 and exert a radial compression force on the check valve bodies 36 to hold the check valves in their intended locations within the passageway 28. With the radial contraction of the tube 26, the retention flanges or barbs 40 on the sides of the cylindrical valve body 36 of each check valve 34 may engage the sidewalls of the tube that defining the passageway 28 and thus function, in conjunction with the radial clamping force on the check valves, to retain the check valves 34 in their intended placement locations. FIG. 17 shows the check valves 34 assembled into the passageway 28 with the tube 26 in its original, unexpanded diameter and the retention flanges 40 of each valve body 36 engaging the sidewalls of the tube forming the passageway.

Figure 15:
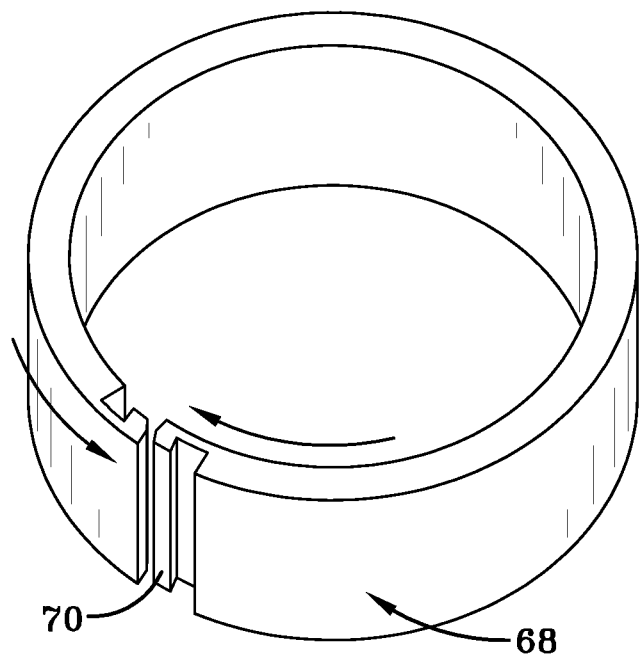
FIG. 15 is a perspective view of a clamp in the "open" position prior to placement over the valve and the tube.
Figure 16:
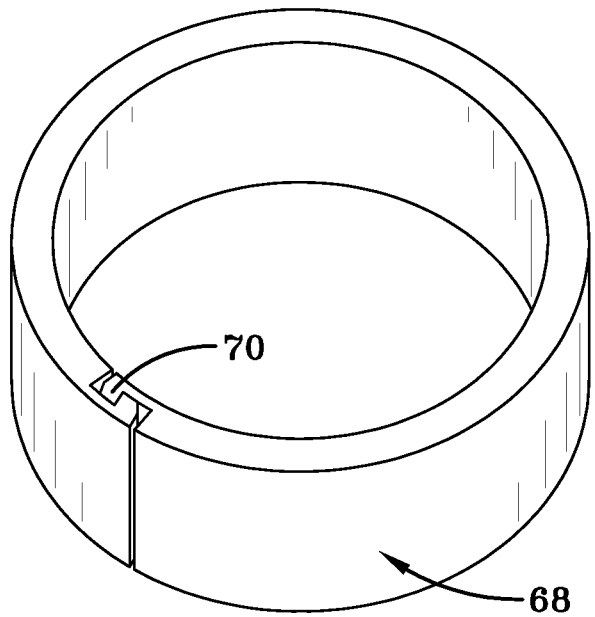
FIG. 16 is a perspective view of a clamp in the "closed" position.

With reference to FIGS. 15 & 16, multiple secondary retention clamps 68, each in the form of a cylindrical collar, may be deployed over respective locations along the tube 26 where the check valves 34 have been positioned. The clamps 68 may be formed of flexible material, such as plastic or metal. The clamps 68 may facilitate receipt of the tube 26 through each clamp. Subsequently, the clamps 68 may be closed into a circular configuration and overlapping locking flanges 70 may engage each clamp 68 in a closed circular configuration over the tube 26. The opening through the clamps 68 may be sized nominally smaller than the tube diameter so that the clamps, in a closed position, press the tube 26 radially inward over the check valves 34.

FIG. 17 shows the placement of the clamps 68 along the tube 26 over respective check valve locations. The resilient radially directed force of the tube 26 combined with engagement of each check valves retention flanges 40 and the clamps 68 may provide redundant means for retaining each check valve 34 in its intended location within the passageway 28. Opening and closing of the check valves 34 during operation of the pump assembly may accordingly not act to dislocate any of the check valves from their positions within the passageway 28.

Figure 18:
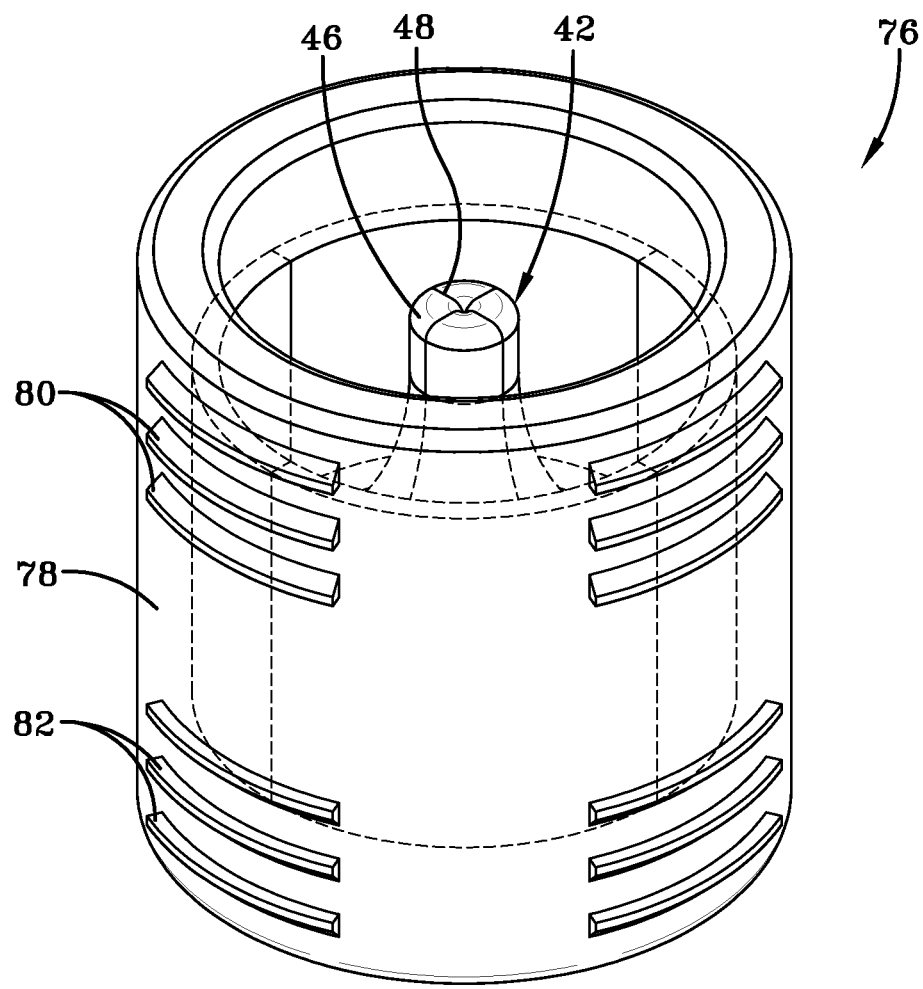
FIG. 18 is a perspective view of an alternative splice-configured check valve.
Figure 19:
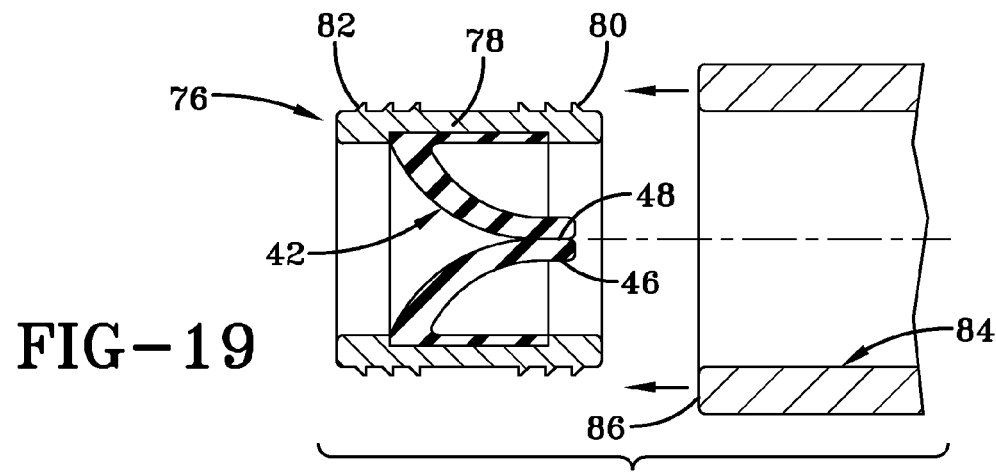
FIG. 19 is a section view showing a tube end going into position over one end of the splice-configure check valve.
Figure 20:
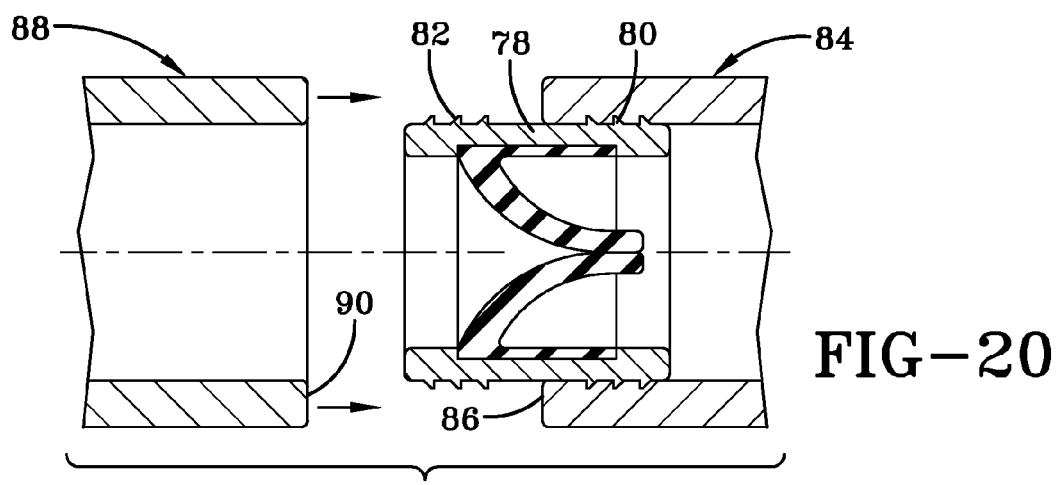
FIG. 20 is a section view showing a second tube end going into position over the other end of the check valve.
Figure 21:
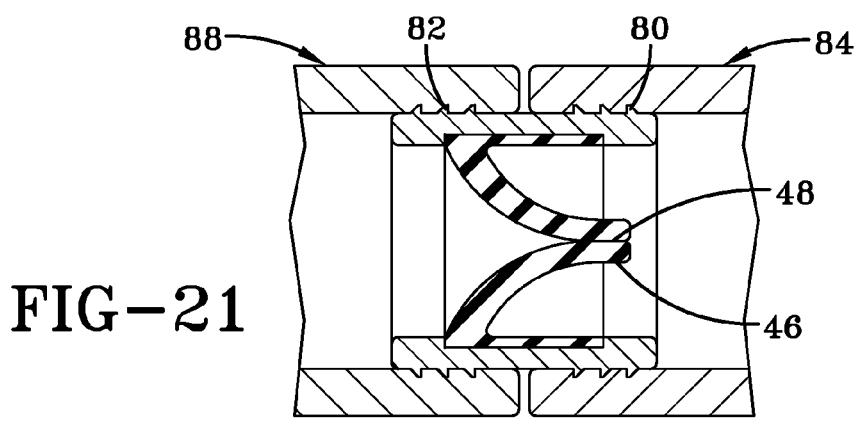
FIG. 21 is a section view showing the check valve with two tubes attached.
Figure 22:
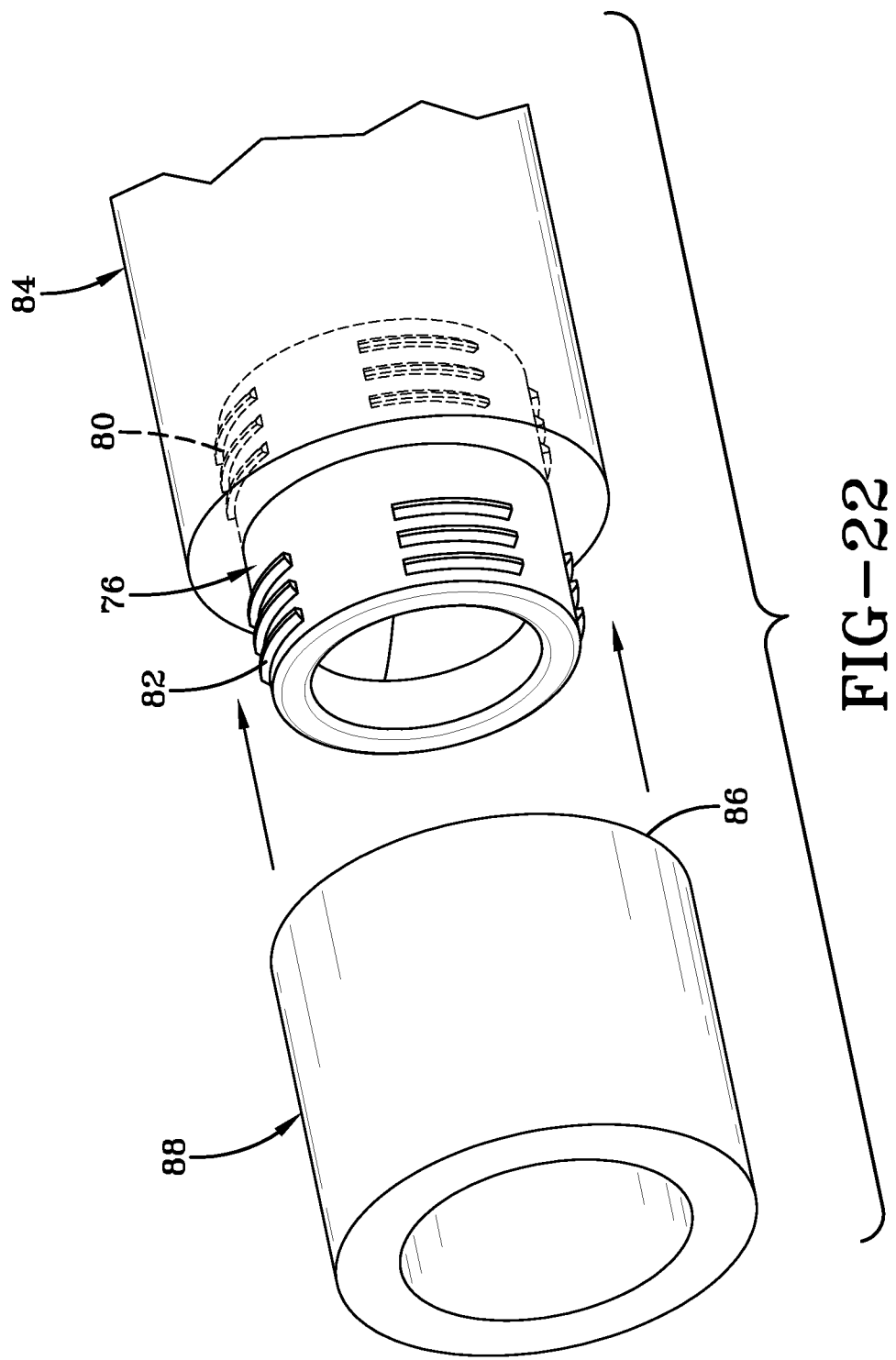
FIG. 22 is a perspective view of the step shown in FIG. 20.
Figure 23:
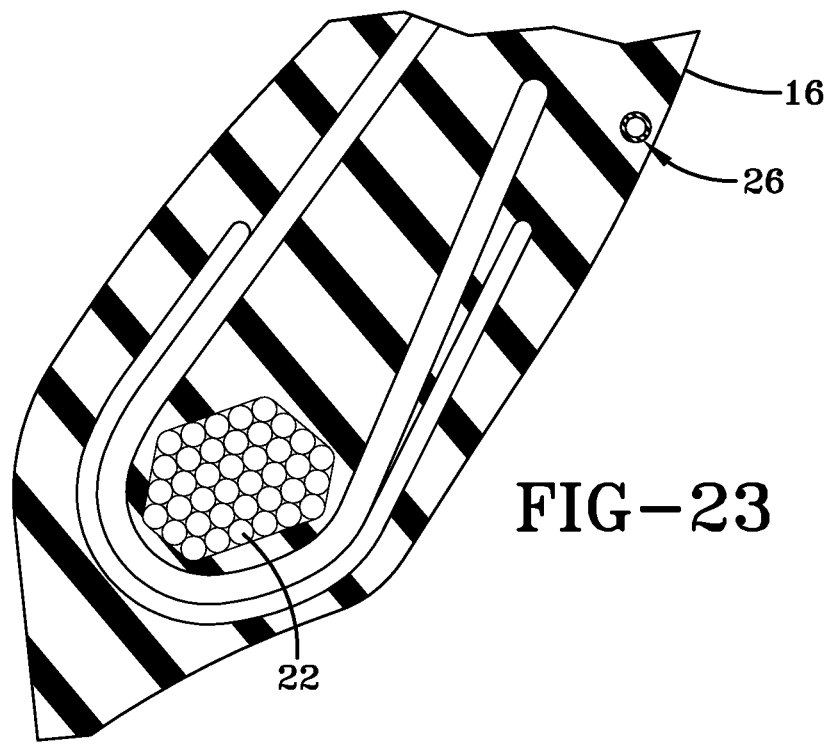
FIG. 23 is a section view taken from FIG. 7 showing the tube.
Figure 24:
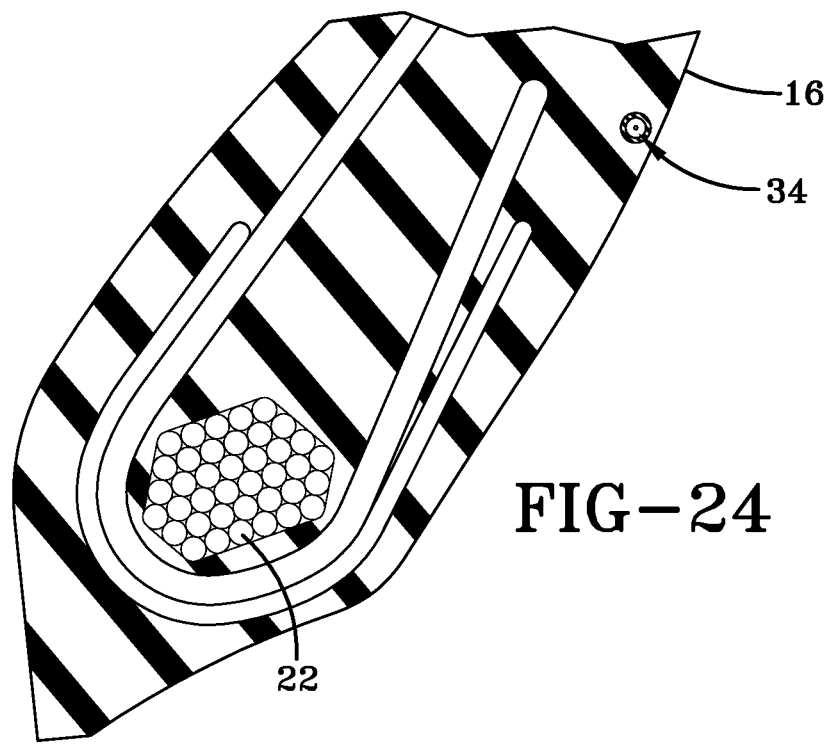
FIG. 24 is a section view taken from FIG. 7 showing the check valve in the tube.

Referring to FIG. 18, an alternatively configured check valve 76 is shown in a splice configuration. The check valve 76 may have relatively a more elongate cylindrical valve body 78 with first and second arrays 80, 82 of retention flanges or barbs. The first array 80 may be disposed at a forward location along the body 78 and the second array 82 may be disposed at a rearward location. The body 78, as will be seen in FIGS. 19, 20, & 21, may have a centered membrane insert 42 configured to operate in the manner previously explained. The elongate body 78 may splice two segments 84, 88 of tube 26 together. An end 86 of each of the tube segments 84, 88 may circumscribe a respective end of the body 78 (FIGS. 19, 20, & 21), whereupon the barb arrays 80, 82 engage internal sidewalls of the tube ends 86, as shown in FIGS. 21 & 22.

With reference to FIGS. 5, 7, 23, & 24, upon completed assembly of the check valves 34 into the passageway 28, the tube 26 may be inserted into a complementarily configured channel formed within a tire sidewall 16 and/or 18. The lower sidewall region shown in FIGS. 23 & 24 above the bead region 22 may flex sufficiently to allow for the segment by segment air pumping action by the tube 26, as described previously. If desired, higher locations on the tire sidewall 16 and/or 18 may be used as a location for the vein pump tube 26 without departing from the present invention. One or both of the tire sidewalls 16, 18 may contain an air pumping tube and the system 10 may be configured in a 180 degree, 360 degree, or dual 180 degree tube configuration.

Figure 5:
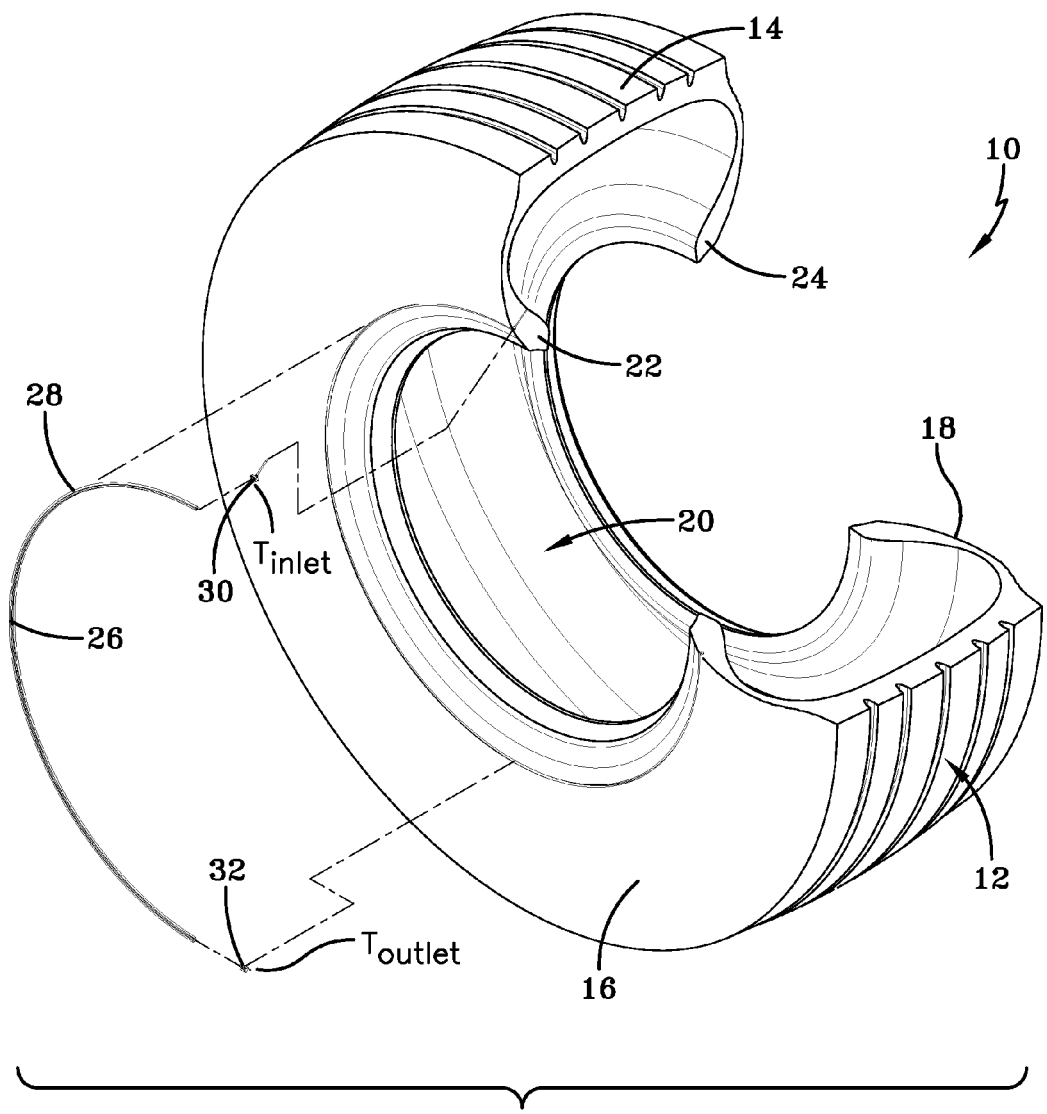
FIG. 5 is a perspective view of a tire and air pumping system assembly.
Figure 25:
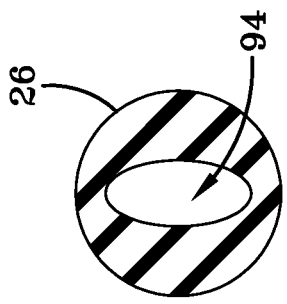
FIGS. 25, 26, 27, & 28 show alternative embodiments of peristaltic tube configurations suitable for use with the check valves.
Figure 26:
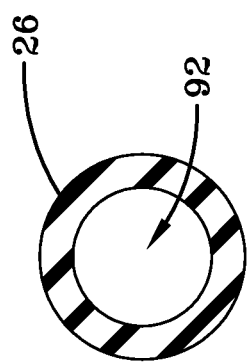
Figure 27:
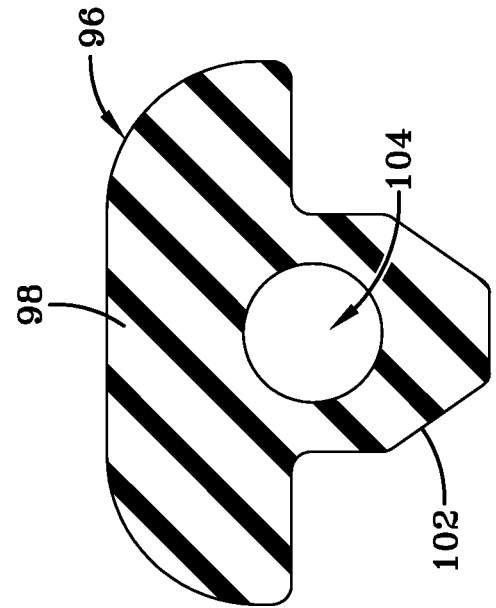
Figure 28:
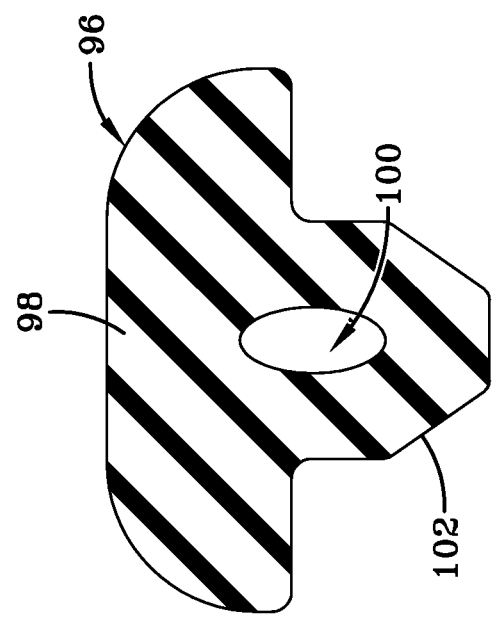

While the tube shown in FIG. 5 is generally of circular cross-section, alternative tube sectional configurations may be used. FIG. 25 shows in cross-section circular tube 26 having a circular through passageway 92. FIG. 26 shows a circular tube 26 modified to have an elliptical air passageway 94. FIG. 27 shows a mushroom shaped tube 96 having adjoining cap 98 and plug 102 tube components. The tube 96 may fit into a sidewall groove with the cap 98 abutting an outer sidewall surface. An elliptical air passageway 100 may extend through the tube 96. FIG. 28 shows a mushroom shaped tube 96, adjoining cap 98, and plug 102 with a circular air passageway 104. It will be understood that the check valves (such as 34) may have a complementary external shape and configuration to the shape of the air passageway 28 into which the check valves are positioned. Likewise, the clamping mechanisms (such as 68) may be configured to fit over the tube configuration in order to impose a radial clamping force on a check valve.

Figure 29:
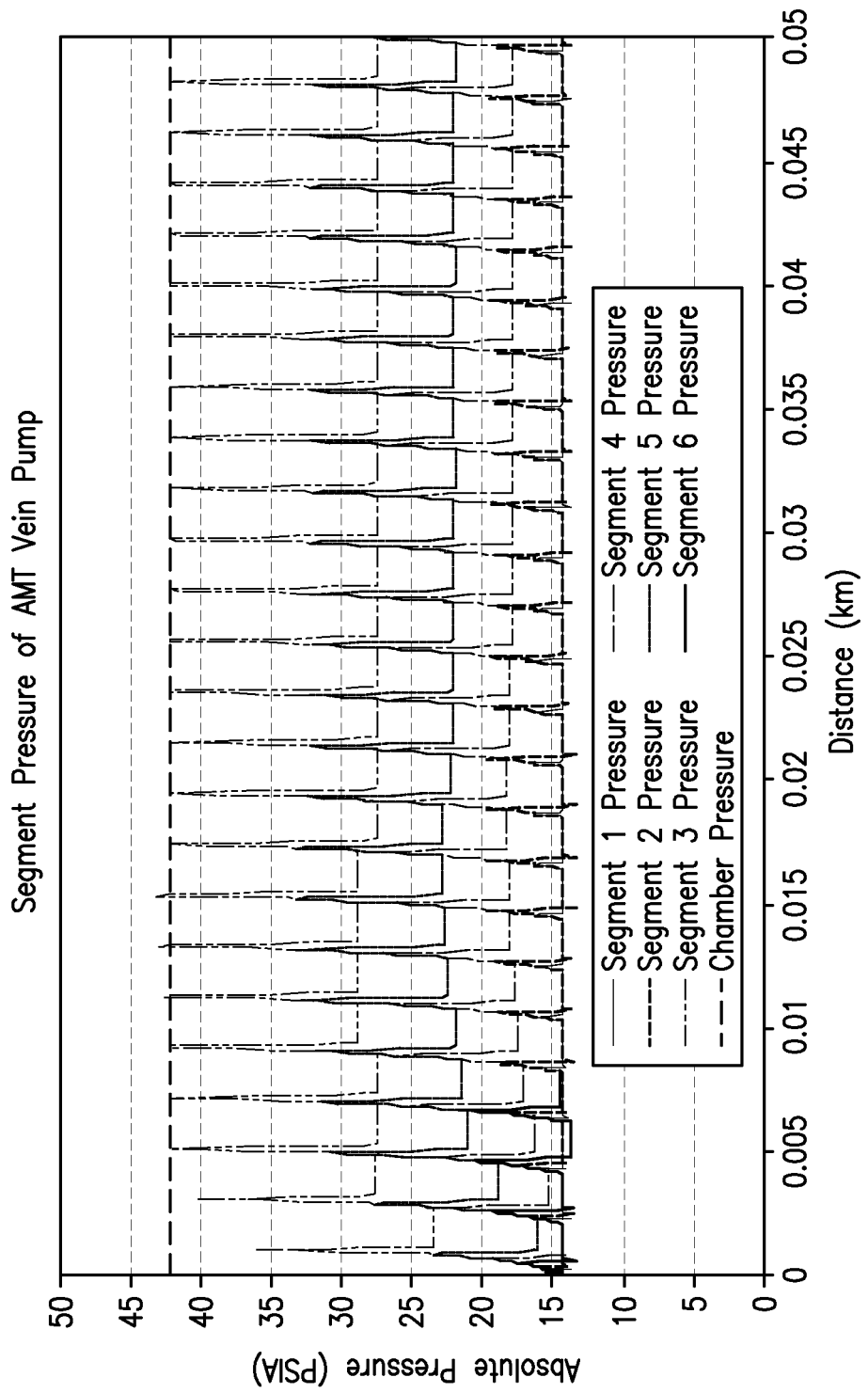
FIG. 29 is a graph showing segment pressure of an AMT Vein pump showing pressure vs. distance (km).

FIG. 29 shows a chart for a multi-segment AMT Vein Pump and graphs of absolute pressure (PSA) vs. distance traveled by the tire (km). FIG. 29 illustrates the amplification of segment pressure as the tube 26, 96 forces air through the series of tube segments. Adjacent segments may be separated by check valves 34. The check valves 34 between the tube segments may open only in a forward direction between air inlet device 30 and air outlet device 32 and may not allow back flow of air within the tube 26, 96 in a reverse direction. In stringing a series of segments together with adjacent segments separated by a check valve 34, a vein-type system 10 may be constructed. The adjoining segments may sequentially pump air, segment to segment, as the tire-mounted tube 26, 96 moves through a rolling tire footprint. The check valves 34 may prevent a back flow of air and operate to increase the pumping efficiency of the vein/tube system 10. Consequently, the vein/tube volumetric size may be as small as possible without compromising achievement of the requisite air pumping volume necessary for maintaining the tire 12 at its rated pressure. The check valve and vein segment construction may thus improve the air pressure level at the outlet portal beyond what would be attained from a single segment, non-check valve, tube of equal length.

An adjustable valve assembly 110 (FIG. 1) in accordance with the present invention, for use with systems such as the example described above, may be in a closed position when the air pressure of the tire cavity is below a selected pressure and in an opened position when the air pressure is above the selected pressure (e.g., pressure relief, relief valve, etc.). The selected pressure may be adjustable by the valve assembly 110. When a selected pressure is exceeded in the tire cavity, the valve assembly 110 may open thereby allowing exhaust air to another location, and eventually to atmosphere. The adjustable valve assembly 110 may define an internal circumferential channel with both extremities: one in the tire chamber and the other at the external part of the tire.

The adjustable valve assembly 110 may include a chamber body 120, a valve 150, a sleeve 170, a piston 180, and a silicone ring 190. The valve 150 may include a valve body and a valve head 154 encased by an elastic material and closing an orifice 1110 of the chamber body 120 thereby allowing air escape, or air pressure relief, when the valve is in an opened position. A part of the movable piston 180 may extend through the chamber body 120 from an internal cavity 156 of the valve body 150 to an internal cavity 122 of the chamber body 120 and be sealed by a gasket or gaskets 1120 120, such as gaskets, o-rings, etc. The chamber internal cavity 122 may be pressurized to a predetermined air pressure. The valve body 150 may be tubular with part of the sleeve 170 partially inserted into the valve body (FIG. 1).

The valve body 150 may include a bore 172 radially drilled to define an air way extending between the chamber internal cavity 122 and the valve internal cavity 156. The sleeve 170 and the piston 180 may partially define the valve internal cavity 156. A silicone ring 190 may be fixed/fitted to an end of the piston 180 opposite the o-ring(s) 1120.

Figure 2:
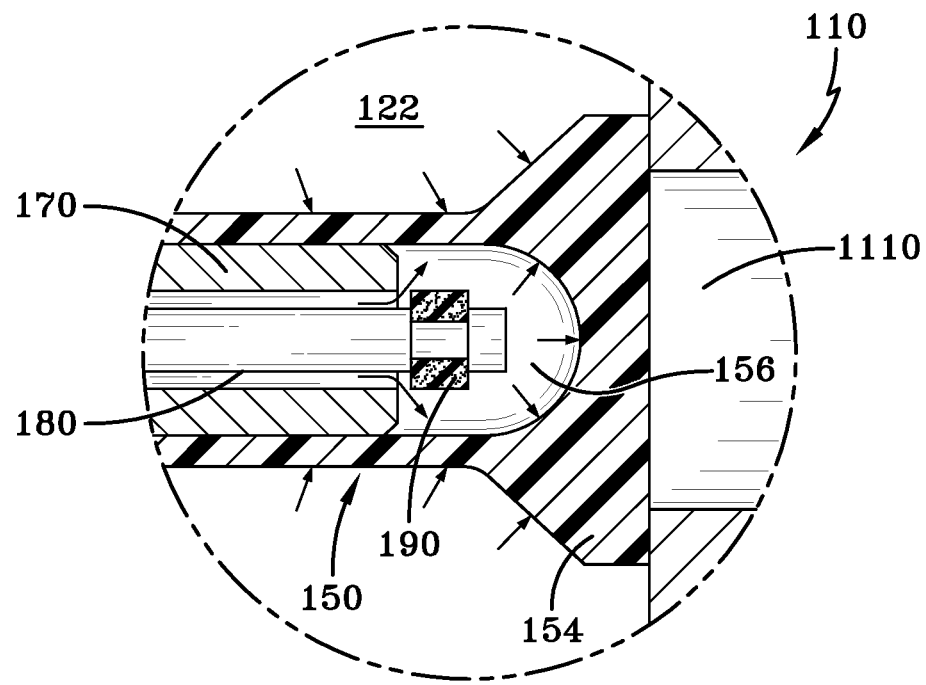
FIG. 2 is a schematic detail of the valve of FIG. 1 under a first condition.
Figure 3:
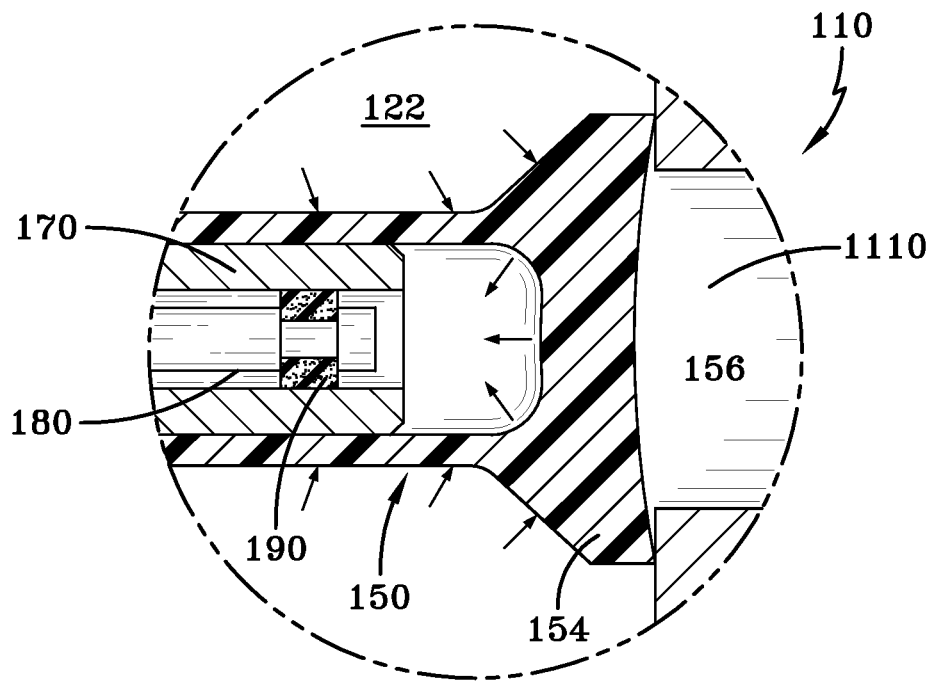
FIG. 3 is a schematic detail of the valve of FIG. 1 under a second condition.

When the piston 180 and silicone ring 190 are entirely within the valve internal cavity 156, the bore 172 between the chamber internal cavity 122 and the valve internal cavity may be open. In this instance, the pressure within the chamber internal cavity 122 and the valve internal cavity 156 may be equalized by radial clearance between the sleeve 170 and the piston 180 (FIG. 2). When the piston 180 and silicone ring 190 are entirely within the sleeve 170, air through the bore 172 may be blocked. In this instance, the pressure within the chamber internal cavity 122 and the valve internal cavity 156 may be independent and separate (FIG. 3).

When the chamber internal cavity 122 has a first pressure (FIG. 2), axial movement of the piston 180 and the silicone ring 190 into the sleeve 170 may cause a pressure decrease/vacuum in the valve internal cavity 156 such that a pump connection, or release vent, 1110 of the tire cavity to the chamber internal cavity 122 is no longer completely blocked by the valve head 154 (e.g., deformation of the elastic/elastomeric valve head, etc.). Thus, while the piston 180 and silicone ring 190 remain in this position, the pressure in the chamber internal cavity 122 may not exceed the first pressure even if an external operation, such as by an AMT assembly as described above, attempts to increase the pressure in the chamber internal cavity.

The valve 150 may be balanced at the first pressure and the smaller air pressure in the valve internal cavity 156 may maintain the valve head in a deformed condition. Air may escape the chamber internal cavity 122 through an exhaust vent 1130 to atmosphere. The exhaust vent 1130 may be one or more radial outlets from the chamber internal cavity 122.

Once the pressure in the valve internal cavity 156 is at its desired value, the assembly 110 may be used in coordination with an AMT assembly, such as the example described above. At this time, the valve head 154 may close the exhaust vent 1110. The valve head 154 may be plastic, resin, silicone, and/or other suitable material.

Figure 4:
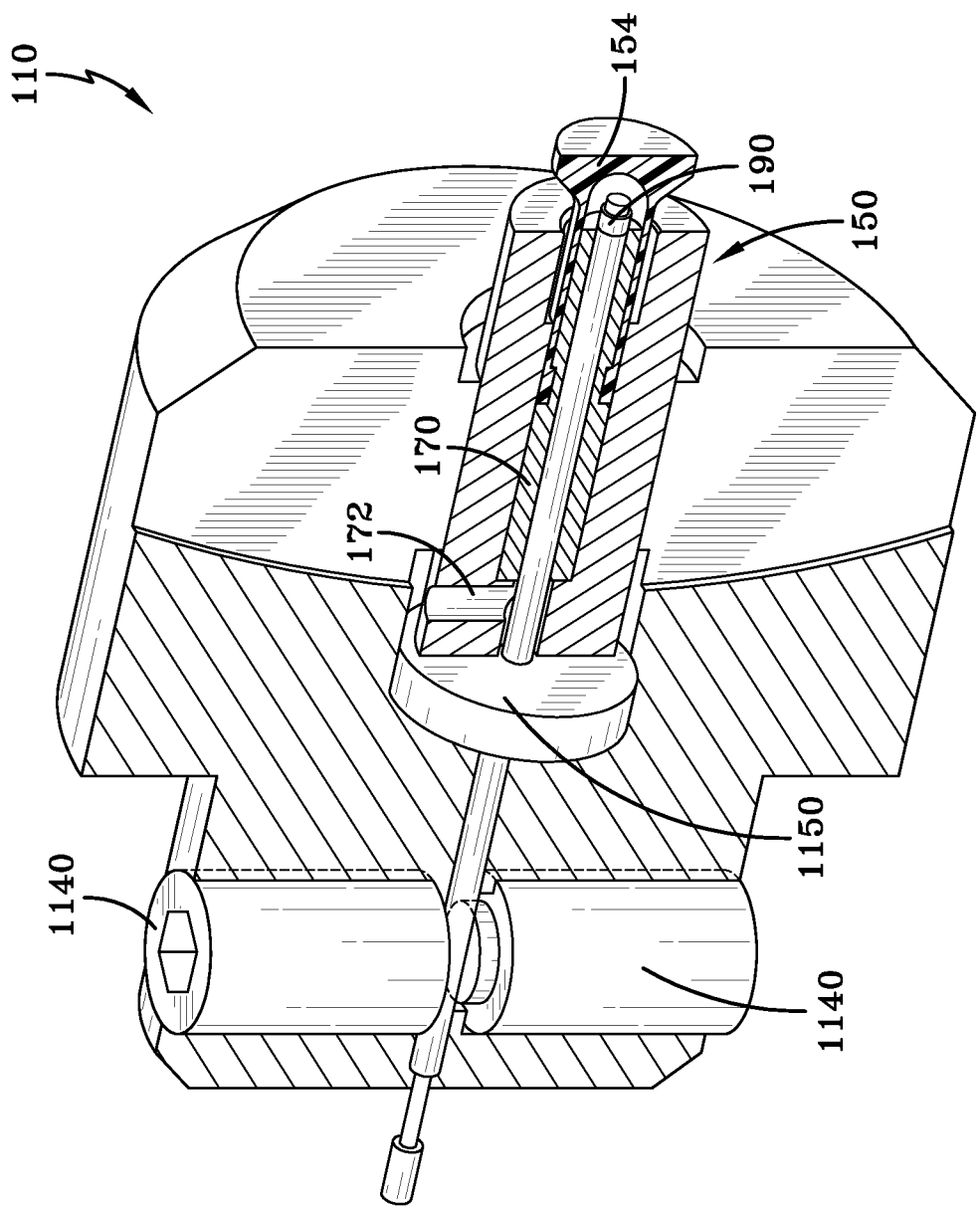
FIG. 4 is a schematic perspective sectional view of the valve of FIG. 1.

The assembly 110 may be adjusted by insertion into an adjustment box (not shown). The box may have two ports, one to inject compressed air at a determined pressure and the other to detect an air leak. After pressurizing the box to the predetermined pressure, a movement of the piston 180 away from the exhaust vent 1110 may be initiated until an air leak is detected. The piston 180 may then be locked into position by one or more set screws 1140 (FIG. 4). The assembly 110 may now be in an adjusted state for the predetermined pressure. The assembly 110 may now be removed from the box and assembled with a pneumatic tire. A supplemental cylindrical gasket/spacer 1150 replacing the o-rings 1120, may be added axially adjacent to the sleeve 170 for mitigating twisting during assembly. One of ordinary skill in the art will appreciate that the subject assembly in a pneumatic tire achieves significant advantage over a pneumatic tire without the assembly.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. An air maintenance tire and air pump assembly comprising:
    a tire having a tread region and first and second sidewalls extending from the tread region and a tire cavity for maintaining pressure;
    an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway operably closing segment by segment in reaction to induced forces from the tire flexing region as the flexing region of the tire wall rotates adjacent a rolling tire footprint;
    the elongate air passageway having at least one check valve device seated within the air passageway; and
    a relief valve assembly comprising a chamber body, a valve, a piston, and a silicone ring, the valve having a valve body and a valve head, the valve head deforming to release over-pressurized air from the tire cavity to atmosphere,
    pressure within the chamber body and the valve body being equalized by radial clearance between the sleeve and the piston.

2. The assembly as set forth in claim 1 wherein the valve head is encased by an elastic material and closes an orifice of the chamber body thereby allowing air escape to atmosphere.

3. The assembly as set forth in claim 1 wherein the piston is movable for extension through the chamber body from an internal cavity of the valve body to an internal cavity of the chamber body.

4. The assembly as set forth in claim 1 further including a gasket for sealing an interface between the piston and the sleeve.

5. The assembly as set forth in claim 1 wherein the valve body is tubular with the sleeve being partially radially inserted into the valve body.

6. The assembly as set forth in claim 1 wherein the valve body includes a radial bore defining an air way extending between an internal cavity of the chamber body and an internal cavity of the valve body.

7. The assembly as set forth in claim 1 wherein the sleeve and the piston partially define a valve internal cavity.

8. The assembly as set forth in claim 1 wherein the silicone ring is fitted to an end of the piston.

9. The assembly as set forth in claim 1 wherein the piston and the silicone ring are entirely within an internal cavity of the valve body and, simultaneously, flow through a radial bore within the sleeve is unobstructed.

10. The assembly as set forth in claim 1 wherein the piston and silicone ring are entirely within the sleeve and air through a radial bore of the sleeve is obstructed.

11. The assembly as set forth in claim 1 wherein pressure within the chamber body and the valve body are independent and separate.

12. The assembly as set forth in claim 1 wherein axial movement of the piston and the silicone ring into the sleeve causes a pressure decrease in the valve body such that a release vent of the tire cavity to the chamber body is no longer completely blocked by the valve head.

13. The assembly as set forth in claim 1 wherein the valve head is maintained in a deformed condition.

14. The assembly as set forth in claim 1 wherein the chamber body includes radial outlets to atmosphere.

15. The assembly as set forth in claim 1 further including a supplemental spacer axially adjacent to the sleeve for mitigating twisting during assembly.

* * * * *